US008694617B2

(12) United States Patent
Finch et al.

(10) Patent No.: US 8,694,617 B2
(45) Date of Patent: Apr. 8, 2014

(54) SYSTEM AND METHOD FOR ORDERS AND TROUBLES METRIC ATTRIBUTION IDENTIFICATION AND AGGREGATION

(75) Inventors: Douglas B. Finch, Kansas City, MO (US); Brad R. Sayre, Kansas City, MO (US); George J. Gerritz, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1272 days.

(21) Appl. No.: 12/012,130

(22) Filed: Jan. 31, 2008

(65) Prior Publication Data

US 2009/0196412 A1   Aug. 6, 2009

(51) Int. Cl.
*G06F 15/173*   (2006.01)
(52) U.S. Cl.
USPC .......................................... 709/223; 709/224
(58) Field of Classification Search
USPC .................................................. 709/223, 224
See application file for complete search history.

(56) References Cited

U.S. PATENT DOCUMENTS

| | | | |
|---|---|---|---|
| 2002/0138378 A1* | 9/2002 | Leskuski | 705/34 |
| 2006/0115072 A1* | 6/2006 | Kessinger et al. | 379/265.03 |
| 2007/0299953 A1* | 12/2007 | Walker et al. | 709/223 |
| 2008/0002821 A1* | 1/2008 | Joseph et al. | 379/265.03 |

* cited by examiner

*Primary Examiner* — Philip B Tran
(74) *Attorney, Agent, or Firm* — Swanson & Bratschun, L.L.C.

(57) ABSTRACT

A system and method for identifying, marking, retaining and aggregating attribute metrics for service order and trouble tickets (ticket data) may be performed as the service order and trouble tickets are loaded into a central data repository to allow user summary reports to be created. Ticket data may be received from remote data repositories by a central repository. The ticket data by then be stored in data records at the central location, then attributes of the ticket data may be calculated. A summary table of the ticket data may then be stored at the central repository, which the metric data in the summary table being updated as records are processed. A report of the attributes may then be generated directly from the summary table.

20 Claims, 3 Drawing Sheets

SYSTEM AND METHOD FOR ORDERS AND TROUBLES METRIC ATTRIBUTION IDENTIFICATION AND AGGREGATION

BACKGROUND OF THE INVENTION

The days of a traditional telephone company providing only telephone service have, in large part, given way to telecommunications companies that provide a much wider variety of services. Some examples of these services include providing entertainment choices, such as television programming and movies, wireless communications, and Internet service, among others. Along with these new services comes greater support needs and a greater amount of data to be managed by the telecommunications companies.

In addition to providing a wide variety of services, many telecommunications companies provide their services across the country and are supported by operations in many different locations. Service locations may be set up in any number of configurations, such as by region, state, city, or any other geographic or non-geographic organization. Some locations may be service centers where problem reports are collected and responded to by technicians, while other locations may be call centers taking orders for new services. Each location may store some or all of the information needed in various data repositories in order to perform tasks for which the location is responsible. However, from an overall company perspective, all of the data relating to the business should be collected and processed into meaningful information.

Data may be generated in several ways. Orders for new service and repair requests for existing service may be entered directly into a system by a call operator who is an employee or contractor for the telecommunications company. More recently, orders and repair requests are commonly being entered directly by customers over the Internet.

Some of the meaningful information that can be generated from the data involves the attributes of the tasks related to service order and trouble ticket data (or simply, "ticket data"). Currently, source data repositories may be located anywhere on a network. The data repositories may be specific to the location and contain certain information related to the function of the location. In order to compile attribute metrics, separate queries are run on each of the separate data repositories each time a report is generated. This may be performed by accessing data stored in multiple data repositories and can be quite time consuming.

Additionally, the reports that are generated often use business logic that is hard coded in scripts on a reporting system. If a change is made for one report, it can frequently be overlooked on another. Also, if some logic changes, many times there are multiple locations that need to be changed in order for the logic to propagate correctly. This duplicated effort is not only burdensome, but can be error prone.

SUMMARY OF THE INVENTION

To overcome the limitations of telecommunications companies managing trouble ticket and service orders, which may include data repositories with hard coded or built-in scripts, a lengthy and resource intensive process, and report-embedded business logic for determining service order and trouble ticket attributes, the principles of the present invention provide for a system and method by which various attribute metrics for order and trouble tickets worked on by field technicians may be identified, marked, retained and aggregated within a central data repository. By identifying and aggregating attributes of order and trouble tasks as they are loaded into the central data repository, reports may be readily available to a user.

One embodiment of a method of determining and aggregating attribute metrics for order and trouble calls may include receiving ticket data at a central location from at least one remote location. The ticket data may then be stored in data records at the central location. Attributes of the ticket data may then be calculated. A summary table including the calculated attributes of the ticket data may then be stored at the central location. The calculating and storing of the attributes of the ticket data to aggregate new service order and trouble ticket data being received into the summary table on an ongoing basis. A report of the attributes of the ticket data from the summary table may then be generated.

Another embodiment may include a system for determining and aggregating attribute metrics for order and trouble calls. The system may include at least one source repository and a central repository, in communication with the source repository and including one or more data tables. A receiving component may be configured to receive ticket data at the central repository from the at least one source repository. The central repository may be configured to receive and store the ticket data from the receiving component. A processor may be in communication with the central repository and configured to process the received ticket data. The processor may also be further configured to calculate attributes of the ticket data. Memory may be in communication with the processor. The processor may be further configured to store a summary table in the memory, with the summary table including the calculated attributes of the ticket data. Calculating and storing of the attributes of the ticket data may be repeated to aggregate new ticket data being received into the summary table on an ongoing basis. Also, a report of the attributes of the ticket data from the summary table may be generated.

BRIEF DESCRIPTION OF THE DRAWINGS

The principles of the present invention is described in detail below with reference to the attached figures, wherein.

DETAILED DESCRIPTION OF THE INVENTION

Figure 1:
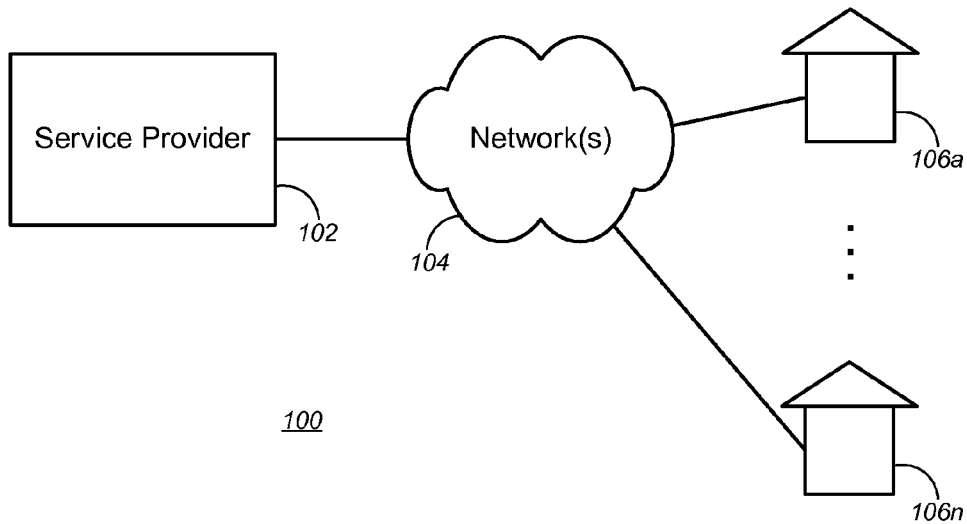
FIG. 1 is a diagram of an exemplary environment for trouble ticket and service order processing.

FIG. 1 is a diagram of an exemplary environment 100 for trouble ticket and service order processing. The environment 100 may include a service provider 102 that is configured to communicate over a network 104 to end users 106a-106n, collectively referred to as 106. The service provider 102 may be a telecommunications provider, a cable company, energy company, or any other type of organization wanting to keep track of trouble calls and orders for new service. The trouble calls and new service orders may be referred to as ticket data. The network 104 over which the service provider 102 and the end users 106 communicate may be a telecommunications network the Internet, a LAN, or any other type of network capable of transmitting information. Additionally, the network 104 may be wired or wireless, without deviating from the scope of the principles of the present invention. The end users 106 may be current customers already serviced by the service provider 102, or may be a new customer, wanting to initiate service with the service provider 102.

For established customers, trouble tickets may be created or placed for repair requests and service orders may be placed for ordering new or additional services. New customers would initially be able to place service orders, until their service begins, when trouble tickets may also be allowed. There are various ways in which the service orders and trouble tickets may be placed. An end user may enter the information over an Internet connection via a website directly to the service provider, an end user may telephone the service provider where an operator for the service provider enters in the information, a telephone interactive voice response prompt service may be provided for an end user calling the service provider, or any other type of communication, including in-person communication where an end user visits a service provider's office.

Figure 2:
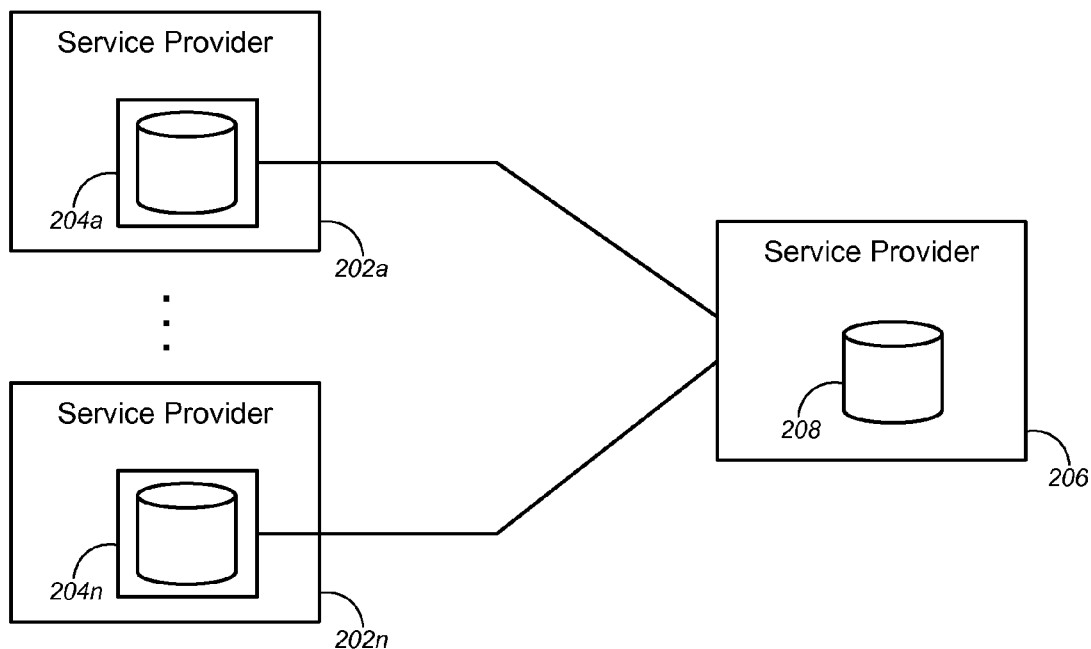
FIG. 2 is a diagram of an exemplary configuration for communicating data from remote service provider sites to a central service provider site.

FIG. 2 is a diagram of an exemplary setup for communicating data from remote service provider sites 202a-202n (collectively 202) to a central service provider site 206. A service provider may have separate sites 202 which may perform different functions, with each site collecting the same and/or different types of information. The separate sites 202 may also be configured as regional offices collecting information, or any other configuration where separate locations are being used to collect information. Within each of the sites 202, there may be a source repository 204a-204n (collectively 204). The source repository 204 may be a server in communication with a database, or any data repository capable of storing data. As will be described in greater detail in FIG. 3, the data from the remote service provider sites 202 may be aggregated on the central service provider site 206 in a central data repository 208, also referred to as an Integrated Reporting Data Mart (IRDM).

Figure 3:
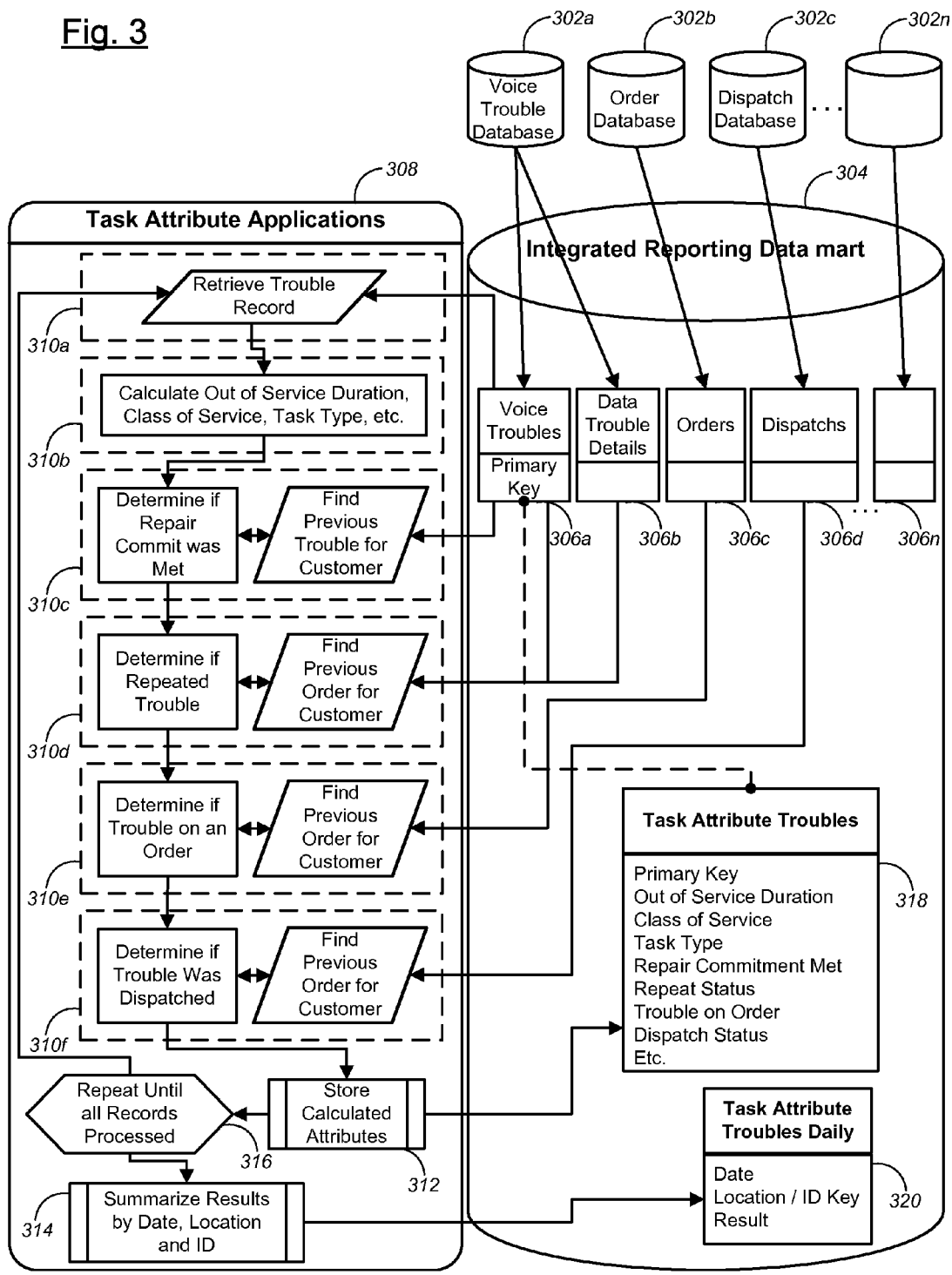
FIG. 3 is a diagram of an exemplary embodiment for determining and aggregating task attributes for service orders and trouble tickets.

FIG. 3 is a diagram of an exemplary embodiment for determining and aggregating the task attributes for service orders and trouble tickets (i.e., the ticket data). Source repositories 302a-302n (collectively 302) may be used to provide data to the central repository 304. The source repositories 302 may be co-located or be separately located. The source repositories 302 may include various source databases representing distinct order information necessary for proper attribute metric generation. Within the various source databases, there may be data that can be broken down further in order to provide useful metrics, as well. Various tables 306a-306n (collectively 306) may be located in the central repository 304, which may be populated by the source repositories 302. In one embodiment, the central repository 304 may be a relational data base. Alternative database configurations may be utilized in accordance with the principles of the present invention.

As the data from the source repositories 302 is entered into the central repository 304, various metrics may be calculated and aggregated by task attribute applications 308. A trouble record, as illustrated by the task attribute troubles table 318, may include a primary key along with various attributes that can be tracked for each record. Each of the fields in the task attribute troubles table 318 maybe populated by the task attribute applications 308.

One of the task attribute applications 308, may include a receive trouble record application 310a, which may be configured to receive a first trouble record. In another task attribute application 308, an out of service duration, class of service, and task type, among other attributes, may be calculated. Another of the task attribute applications 308 may include a repair commitment application 310c, which may be configured to determine if a repair commitment was met. The repair commitment application 310c may use information obtained from the trouble record received in retrieve trouble record application 310a as well as relevant information located in the central repository tables 306. Another of the task attribute applications 308 may be a repeated trouble application 310d, which may be configured to determine if a reported trouble is repeated. Determination as to whether the trouble is repeated may be done by locating previous orders from the customer from the relevant tables 306 in the source repository 304 that correspond to the trouble record currently being processed. Another of the task attribute applications 308 may be an order trouble application 310e, which may be configured to determine if there was trouble on a previous service order. By using the primary key of the data from the trouble record with the data located in the relevant tables 306 of the central repository 304, previous orders maybe located and a determination may be made as to whether there was trouble on a customer's previous order. In order to determine if a trouble call was responded to, dispatch trouble application 310f may determine from the relevant data tables 306 located in the central repository 304 what dispatches, if any, have occurred that are linked to the customer from the current trouble record.

The task attribute applications 308 that are used to calculate the attributes may store the calculated attributes 312 temporarily while there are more records to be processed 316. The calculated attributes are then placed in the task attribute troubles table 318 in the central repository 304 as each record is processed. After a set of records have been processed, the results may be summarized by date, location, and ID at step 314, and then stored in a task attribute troubles daily summary table 320 located on the central repository 304. It should be noted that while a task attribute troubles record 318 is depicted, service order records may be processed in the same manner, as well.

Figure 4:
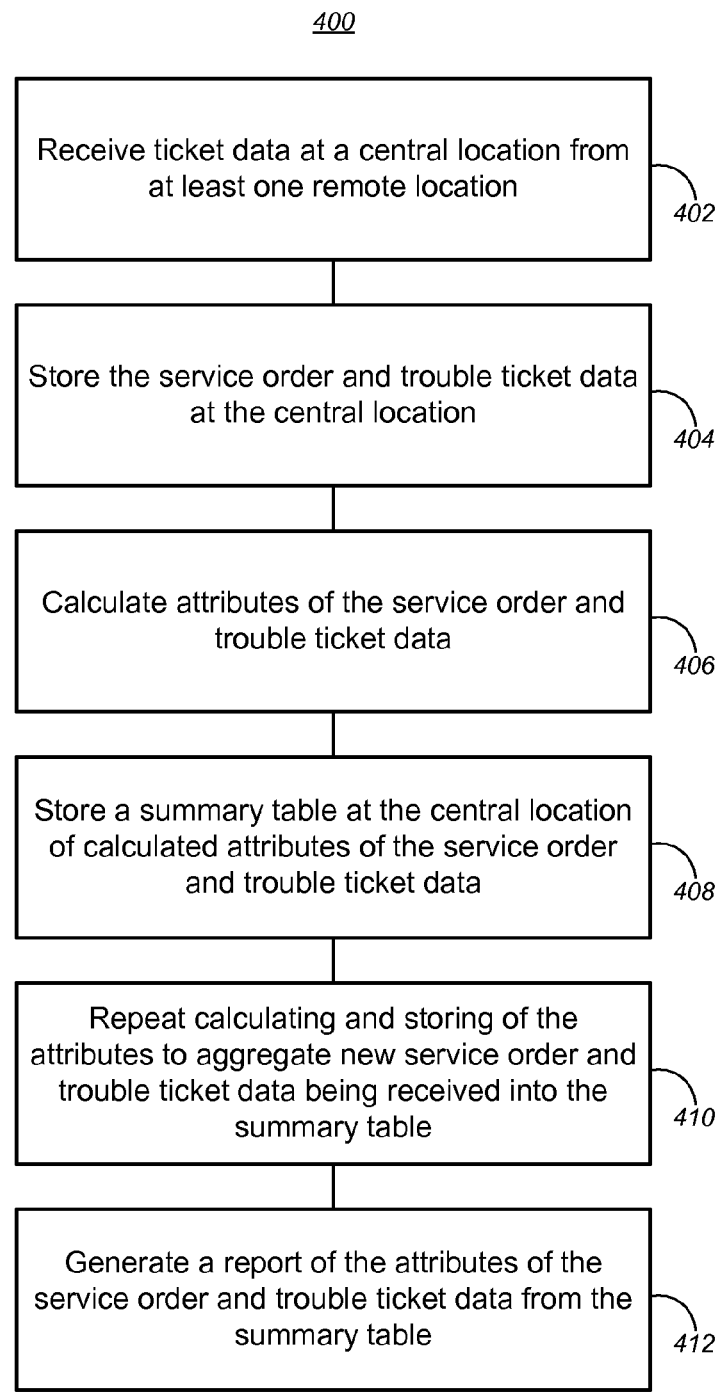
FIG. 4 is a flow diagram of an exemplary process for determining and aggregating attribute metrics for order and trouble calls.

FIG. 4 is a flow diagram of an exemplary method 400 for determining and aggregating attribute metrics for service orders and trouble calls. At step 402, a central data repository may receive ticket data at a central location from at least one remote location. The remote locations may include one or more databases collecting information related to voice troubles, orders, dispatches, or any other type of data relating to the metrics that can be calculated for service orders and trouble tickets. At step 404, the service order and trouble ticket data may be stored at the central location. The central location may be any repository, such as a database or data mart, capable of storing data. Tables located in the central location may have a one-to-one or a one-to-many correspondence with the remote locations, and should not be considered limited to simply one table for each remote location.

At the next step, 406, attributes of the service orders and trouble tickets may be calculated. There can be many different types of attributes depending upon the type of data being collected. For service orders and trouble tickets, some attributes that may be calculated include out of service duration, class of service, task type, repair commitment met, repeat status, trouble on the order, and dispatch status, among others. These calculations may be performed by combining information from a variety of the tables in the central location for each ticket or record. At step 408, the calculated attributes of the service order and trouble ticket data may be stored in a summary table at the central location. In addition, the calculated attributes may be stored in task attribute applications that are calculating the attributes. At step 410, the calculating and storing of the attributes to aggregate new service order and trouble ticket data being received into the summary table is repeated for each ticket, which may allow for the batch of tickets being processed to be completed before a final summary of the attributes and/or statistics is made. Once the tickets have been processed, a higher-level summary may be made of the summary table, which indicates the date the processing occurred, the location or ID key, any useful results, or any other information that is requested for the higher level summary. In step 412, a report may be generated of the attributes of the service order and trouble ticket data from the created summary table. The attribute report may be generated after every ticket is processed or, alternatively, after each batch of tickets is processed. By aggregating the attributes used for the reports as the tickets are loaded into the database, no or minimal processing or work in the report is performed to utilize the attributes. In other words, all or substantially all of the calculating for the attributes has already occurred.

The previous description is of at least one embodiment for implementing the invention, and the scope of the invention should not necessarily be limited by this description. The scope of the present invention is instead defined by the following claims.

What is claimed is:

1. A method for determining and aggregating attribute metrics for order and trouble calls, said method comprising:
   receiving service order and trouble ticket data at a central location from at least one remote location;
   storing the service order and trouble ticket data in data records at the central location;
   calculating one or more attributes of the service order and trouble ticket data;
   calculating one or more aggregate metrics for each of the one or more attributes of the service order and trouble ticket data, each of the one or more aggregate metrics being calculated based on the one or more attributes from the service order and trouble ticket data and from past service order and trouble ticket data;
   storing a summary table at the central location, the summary table including the calculated one or more attributes of the service order and trouble ticket data;
   repeating calculating and storing of the one or more attributes of the service order and trouble ticket data to aggregate new service order and trouble ticket data being received into the summary table on an ongoing basis; and
   generating a report of the calculated attributes of the service order and trouble ticket data from the summary table, the report including one or more aggregate metrics for each of the one or more attributes of the service orders and service tickets.

2. The method according to claim 1, wherein receiving occurs as a batch communication of the service order and trouble ticket data.

3. The method according to claim 1, further comprising storing the calculated one or more attributes in variables within a task attribute application for use in calculating additional attributes of service order and trouble ticket data.

4. The method according to claim 1, wherein an ongoing basis is in response to a triggered event.

5. The method according to claim 1, wherein storing the one or more attributes include storing out of service duration.

6. The method according to claim 1, wherein storing the one or more attributes includes storing a primary key, the primary key linking data records in source tables with the summary table.

7. The method according to claim 1, further comprising storing business logic processed results by task type.

8. The method according to claim 1, wherein calculating the one or more attributes of the service order and trouble ticket data uses business rules.

9. The method of claim 8, wherein calculating using business rules includes determining if a customer has had a previous repair.

10. The method according to claim 1, wherein receiving service order and trouble ticket data from the remote data repositories includes receiving from at least one of a voice trouble database, order database, and dispatch database.

11. A system for determining and aggregating attribute metrics for order and trouble calls, said system comprising:
    at least one first source repository;
    a central repository, in communication with said source repository and including one or more data tables;
    a receiving component configured to receive ticket data at said central repository from said at least one first source repository;
    said central repository configured to receive and store the ticket data from said receiving component;
    a processor in communication with said central repository and configured to process the received ticket data, the processor further configured to calculate one or more attributes of the ticket data and to calculate one or more aggregate metric for each of the one or more attributes of the ticket data, each of the aggregate metrics being calculated based on the one or more attribute from the ticket data and from past ticket data;
    memory in communication with said processor, said processor further configured to:
       store a summary table in said memory, the summary table including the calculated one or more attributes of the ticket data;
       repeat calculating and storing of the one or more attributes of the ticket data to aggregate new ticket data being received into the summary table on an ongoing basis; and
       generate a report of the calculated one or more attributes of the ticket data from the summary table, the report including aggregate metrics for each of the one or more attributes of the ticket data.

12. The system according to claim 11, wherein said receiving component is configured to receive the ticket data in a batch communication.

13. The system according to claim 11, wherein said processor is further configured to store the calculated one or more attributes in variables within a task attribute application for use in calculating additional attributes of ticket data.

14. The system according to claim 11, wherein said processing unit initiates processing the ticket data in response to an event.

15. The system according to claim 11, wherein the one or more attributes include an out of service duration.

16. The system acceding to claim 11, wherein the one or more attributes are stored with a primary key, the primary key the ticket data stored in said central repository and the summary table.

17. The system according to claim 11, wherein business logic is used to process results by task type.

18. The system according to claim 11, wherein the one or more attributes of the ticket data are calculated by business rules.

19. The system of claim 18, wherein the business rules include a determination for determining if a customer has had a previous repair.

20. The system according to claim 11, wherein the remote data repositories are at least one of a voice trouble database, order database, and dispatch database.

\* \* \* \* \*